(12) United States Patent
Gagner et al.

(10) Patent No.: US 9,342,945 B2
(45) Date of Patent: May 17, 2016

(54) GAMING DEVICE WITH A VIRTUALIZATION MANAGER

(75) Inventors: Mark B. Gagner, West Chicago, IL (US); Craig J. Sylla, Round Lake, IL (US)

(73) Assignee: Bally Gaming, Inc., Las Vegas, NV (US)

( * ) Notice: Subject to any disclaimer, the term of this patent is extended or adjusted under 35 U.S.C. 154(b) by 2567 days.

(21) Appl. No.: 12/066,205

(22) PCT Filed: Sep. 6, 2006

(86) PCT No.: PCT/US2006/034600
§ 371 (c)(1),
(2), (4) Date: Mar. 7, 2008

(87) PCT Pub. No.: WO2007/030472
PCT Pub. Date: Mar. 15, 2007

(65) Prior Publication Data
US 2010/0173699 A1    Jul. 8, 2010

Related U.S. Application Data

(60) Provisional application No. 60/715,520, filed on Sep. 9, 2005, provisional application No. 60/749,334, filed on Dec. 9, 2005.

(51) Int. Cl.
G07F 17/32    (2006.01)
G06F 9/455    (2006.01)

(52) U.S. Cl.
CPC ............ *G07F 17/32* (2013.01); *G06F 9/45558* (2013.01)

(58) Field of Classification Search
USPC ................................................. 463/16; 718/1
See application file for complete search history.

(56) References Cited

U.S. PATENT DOCUMENTS

| | | | |
|---|---|---|---|
| 6,199,181 B1 * | 3/2001 | Rechef et al. | 714/38.13 |
| 6,314,501 B1 | 11/2001 | Gulick et al. | |
| 6,645,077 B2 | 11/2003 | Rowe | |
| 6,875,110 B1 * | 4/2005 | Crumby | 463/42 |
| 2003/0145210 A1 * | 7/2003 | Taylor | 713/182 |
| 2004/0053657 A1 * | 3/2004 | Fiden et al. | 463/16 |
| 2005/0076324 A1 * | 4/2005 | Lowell et al. | 717/100 |
| 2006/0166729 A1 * | 7/2006 | Saffari et al. | 463/17 |

OTHER PUBLICATIONS

"International Search Report for Application No. PCT/US2006/034600, date mailed Mar. 8, 2007", 5 pgs.
"Written Opinion of the International Searching Authority for Application No. PCT/US2006/034600, date mailed Mar. 8, 2007", 8 pgs.

* cited by examiner

*Primary Examiner* — Tsan-Yu J Huang
(74) *Attorney, Agent, or Firm* — Nixon Peabody LLP

(57) ABSTRACT

Gaming devices with virtualization managers are described herein. In one embodiment, a gaming device includes a plurality of operating systems, each of the operating systems to facilitate execution of one or more gaming applications. The gaming device also includes gaming device resources for use by ones of the plurality of operating systems and a virtualization manager to share the gaming device resources between the plurality of operating systems during virtually simultaneous execution of the plurality of operating systems.

20 Claims, 11 Drawing Sheets

GAMING DEVICE WITH A VIRTUALIZATION MANAGER

RELATED APPLICATIONS

This application is a U.S. National Stage Filing under 35 U.S.C. 371 from International Patent Application Ser. No. PCT/US2006/034600, filed Sep. 6, 2006, and published on Mar. 15, 2007 as WO 2007/030472 A2 and republished as WO 2007/030472 A3, which claims the priority benefit of U.S. Provisional Application Ser. No. 60/715,520 filed Sep. 9, 2005 and U.S. Provisional Application Ser. No. 60/749,334 filed Dec. 9, 2005, the contents both of which are incorporated herein by reference in their entirety.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever. Copyright 2005, 2006 WMS Gaming, Inc.

FIELD

This invention relates generally to the field of gaming devices and more particularly to the field of sharing resources between operating systems in gaming devices.

BACKGROUND

Wagering game networks can include numerous gaming machines and servers for performing a multitude of gaming functions, such as conducting wagering games and tracking money collected and awarded. Gaming servers (e.g., accounting servers, wide area progress servers, etc.) are typically configured with hardware and software for tracking and/or distributing data throughout a gaming network. The gaming servers typically provide services by executing multiple application programs on a single multi-tasking operating system. Multi-tasking operating systems, such as Linux and MS-Windows, share system resources (e.g., disk drives, memory, etc.) between multiple application programs, thereby enabling gaming devices to run multiple application programs virtually simultaneously within a single operating system in a gaming device.

BRIEF DESCRIPTION OF THE FIGURES

The present invention is illustrated by way of example and not limitation in the Figures of the accompanying drawings in which.

DESCRIPTION OF THE EMBODIMENTS

Systems and methods for using virtualization managers in gaming devices are described herein. This description of the embodiments is divided into six sections. The first section provides an introduction to embodiments of the invention. The second section describes example gaming device architectures, while the third section describes example operations performed by some embodiments of the gaming device architectures. The fourth section describes additional gaming device embodiments and the fifth section describes gaming devices and gaming machines in greater detail. The sixth section provides some general comments.

Introduction

Figure 1:
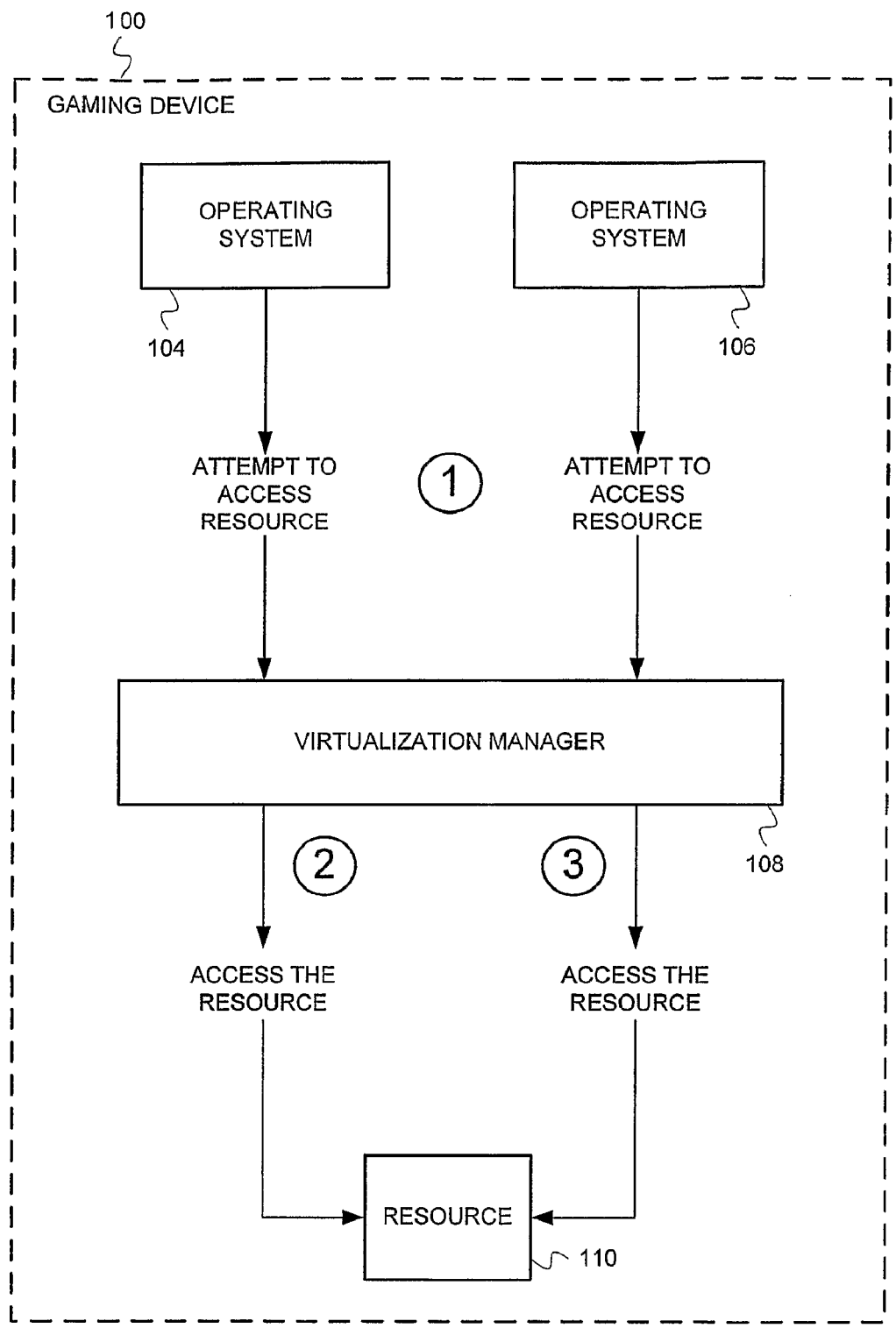
FIG. 1 is a diagrammatic illustration of multiple operating systems sharing a resource in a gaming device, according to exemplary embodiments of the invention.

This section introduces embodiments of a gaming device including a virtualization manager for executing multiple operating systems. Embodiments of the invention enable a single gaming device to operate as multiple virtual gaming devices by facilitating resource sharing between a plurality of operating systems. For example, a single gaming device can operating as a wide area progressive server, gaming content download server, and accounting server. Furthermore, because embodiments enable gaming devices to run multiple operating systems virtually simultaneously, gaming machines can split operations for conducting a wagering game between applications running on two or more operating systems. For example, the gaming machine can perform a wagering game's input/output (I/O) operations using one operating system, while determining the wagering game's results using another operating system. FIG. 1 describes resource sharing in greater detail.

FIG. 1 is a diagrammatic illustration of multiple operating systems sharing a resource in a gaming device, according to exemplary embodiments of the invention. As shown in FIG. 1, the gaming device 100 includes operating systems 104 and 106, virtualization manager 108, and resource 110. The resource 110 can include hardware resources (e.g., disk drive, physical port, etc.) or virtual resources (e.g., virtual disk, virtual port, etc.). The virtualization manager 108 allows the operating systems 104 and 106 to run virtually simultaneously and to share the resource 110. FIG. 1 shows three stages of resource sharing.

At stage 1, the virtualization manager 108 detects both operating systems 104 and 106 attempting to access the resource 110. The attempts can occur close in time. For example, first operating system 104 and then operating system 106 may attempt to access the resource 110. The attempts could also occur simultaneously.

At stage 2, the virtualization manager 108 allows the operating system 104 to access the resource 110. At stage 3, the virtualization manager 108 allows the operating system 106 to access the resource 110. The virtualization manager 108 can use any suitable resource allocation technique for determining an order in which the operating systems access the resource 110 (e.g., first come first serve, priority scheduling, etc.). Because embodiments allocate gaming device resources between multiple operating systems, each operating system can operate as if it is the only operating system using a gaming device's resources. Thus, a single gaming device can operate as multiple servers and a gaming machine can conduct a wagering gaming using applications running on a plurality of operating systems. These and other features will be described in more detail below. The next section describes example gaming devices in more detail.

Example Gaming Devices

Figure 2:
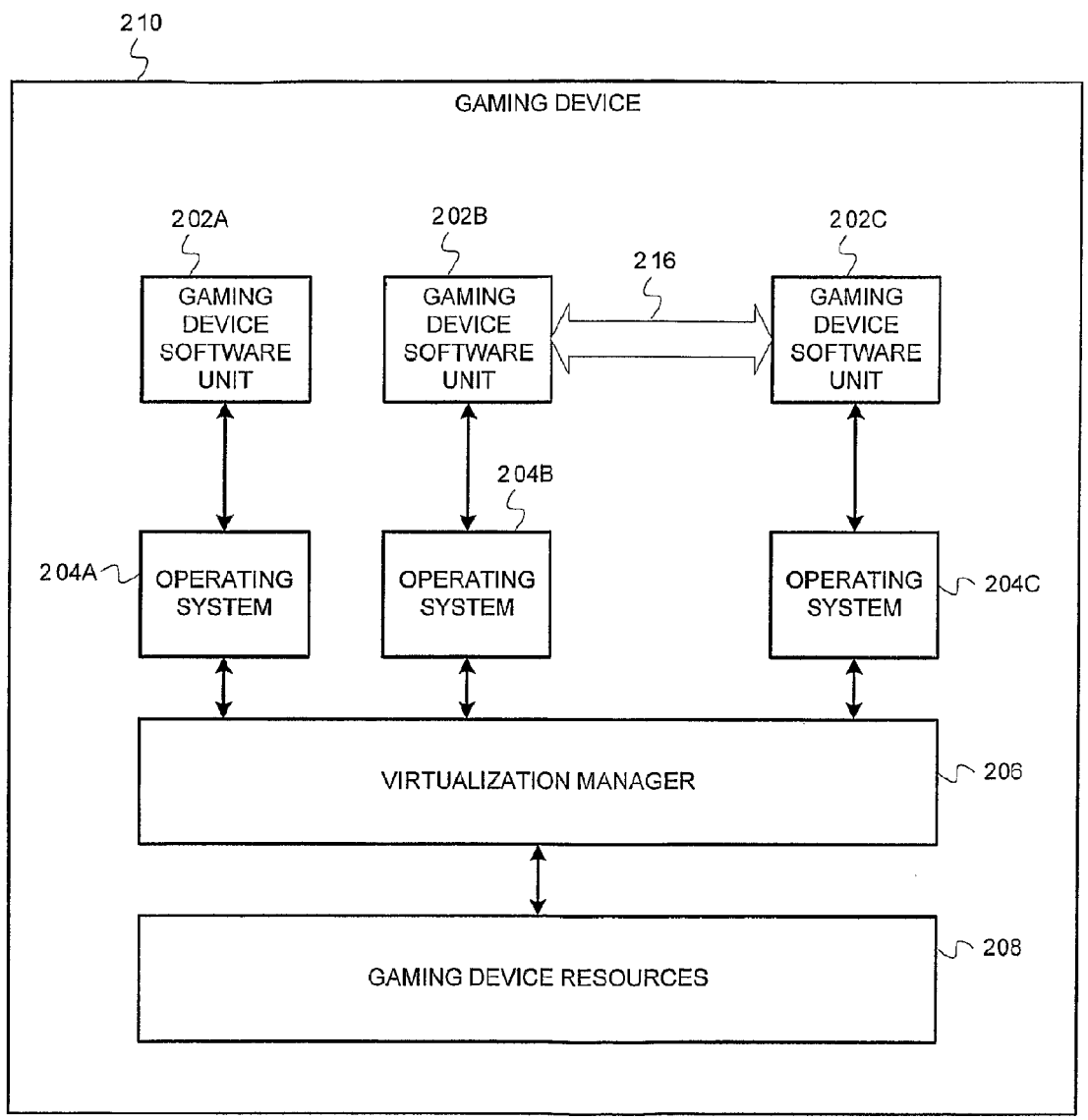
FIG. 2 is a block diagram illustrating a gaming device, according to example embodiments of the invention.

FIG. 2 is a block diagram illustrating a gaming device, according to example embodiments of the invention. According to embodiments, gaming device 210 can operate as a gaming machine, gaming server, control server, and/or any other device in a gaming network.

As shown in FIG. 2, the gaming device 210 includes a plurality of gaming device software units 202a-c and a plurality of operating systems 204a-c. Each of the operating systems 204a-c provides services to the gaming device software units and manages access to gaming device resources 208. For example, the operating system 204a can be a Linux operating system, while the gaming device software unit 202a can include applications compatible with the Linux operating system. The other operating systems 204b-c can include the same Linux version, a different Linux version, or different operating systems altogether (e.g., MS-Windows, Solaris, etc.).

The gaming device 210 also includes a virtualization manager 206 and gaming device resources 208. The virtualization manager 206 can, among other things, facilitate sharing of the gaming device resources 208 between the operating systems 204a-c. The gaming device resources 208 can include processors, disk drives, network interface devices, random access memory, video cards, audio cards, and/or any other suitable computer hardware. In one embodiment, the gaming device resources 208 include some or all of the hardware described below, in the discussion of FIG. 7.

In one embodiment, a gaming device software unit operating with one operating system can communicate with a gaming device software unit operating with different operating systems of the gaming device 210. As shown in FIG. 2, the gaming device software unit 202b can establish a communications channel 216 with gaming device software unit 202b even though each gaming device software unit is executing on a different operating system. The communications channel can include a socket, shared memory, direct memory access channels, serial port connection, or any other suitable means for communication information between operating systems.

Operations performed by embodiments of the gaming device are described in the next section.

System Operations

This section describes operations performed by embodiments of the invention. In the discussion below, the flow diagrams will be described with reference to the block diagrams presented above. In certain embodiments, the operations are performed by instructions residing on machine-readable media (e.g., software), while in other embodiments, the operations are performed by hardware and/or other logic (e.g., digital logic).

Figure 3:
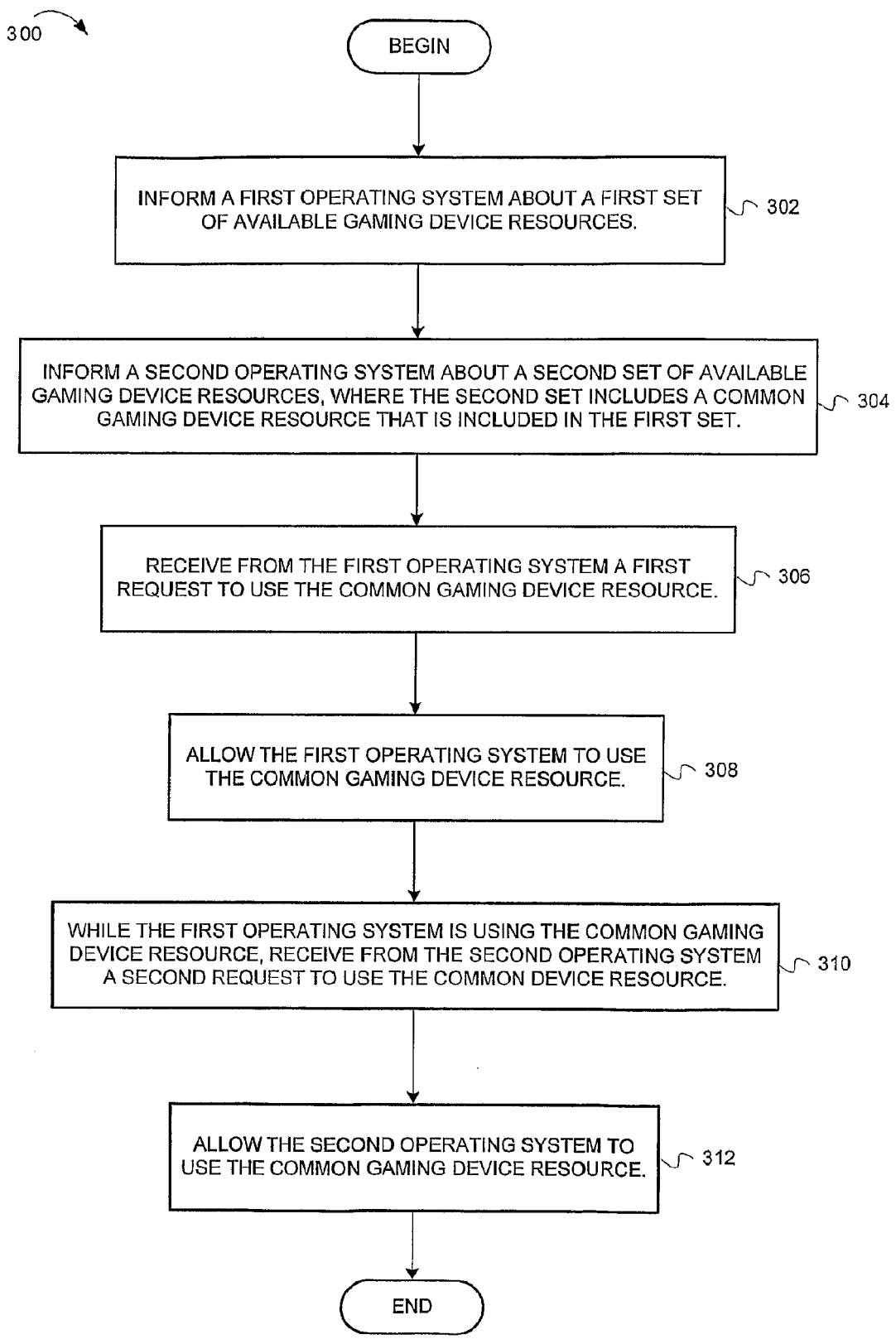
FIG. 3 is a flow diagram illustrating operations for sharing resources between multiple operating systems in a gaming device, according to example embodiments of the invention.
Figure 4:
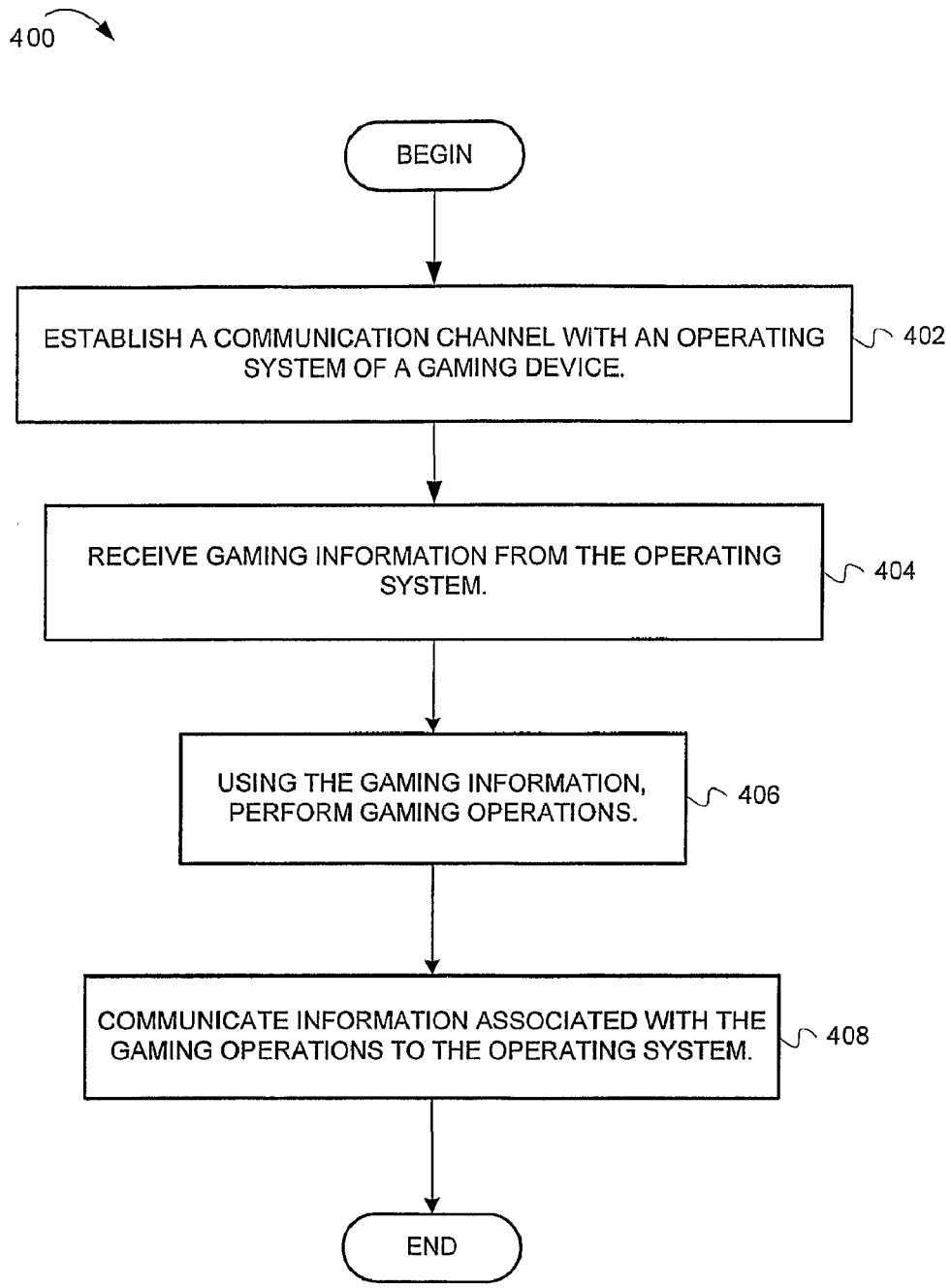
FIG. 4 is a block diagram illustrating components of a gaming machine, used in conjunction with example embodiments of the invention.

FIGS. 3 and 4 are discussed below. FIG. 3 describes operations for sharing resources between multiple operating systems in a gaming device, while FIG. 4 describes operations for communicating between operating systems of a gaming device. This description will proceed with a discussion of resource sharing.

As noted above, embodiments of the virtualization manager can facilitate resource sharing between multiple operating systems. In one embodiment, the virtualization manager can share one or more processors between a plurality of operating systems 204. For example, the virtualization manager 206 can cause the operating systems 204a-c to take turns executing on a set of one or more processors. When an operating system finishes its turn on the processor, the virtualization manager 206 can store state information, so the operating system can resume execution where it left off. As each operating system executes on a processor, the operating system can request and consume resources. FIG. 3 describes operations for sharing resources between a plurality of operating systems.

FIG. 3 is a flow diagram illustrating operations for sharing resources between multiple operating systems in a gaming device, according to example embodiments of the invention. Flow diagram 300 commences at block 302.

At block 302, a first operating system is informed about a first set of available gaming device resources. For example, when the virtualization manager 206 starts-up the operating system 204a, it informs the operating system 204a about a first set of resources included in the gaming device resources 208. The first set can include a disk drive, video card, network interface, processor, etc. The flow continues at block 304.

At block 304, a second operating system is informed about a second set of available gaming device resources, where the second set of resources includes a common gaming device resource that is in both the first and second sets. For example, when the virtualization manager 206 starts-up the operating system 204b, it informs the operating system 204b about a second set of resources which includes a disk drive that is common to the first and second sets (i.e., the disk drive is available to both operating systems 204a and 204b). The flow continues at block 306.

At block 306, a request to use the common gaming device resource is received from the first operating system. For example, the virtualization manager 206 receives from the operating system 204a a request to read from the disk drive. The flow continues at block 308.

At block 308, the first operating system is allowed to use the common gaming device resource. For example, the virtualization manager 206 allows the operating system 204a to read from a disk drive. The flow continues at block 310.

At block 310, while the first operating system is using the common gaming device resource, a second request to use the common device resource is received from the second operating system. For example, while the operating system 204a is reading from the disk drive, the virtualization manager 206 receives from the operating system 204b a request to use a disk drive. The flow continues at block 312.

At block 312, the second operating system is allowed to use the gaming device resource. For example, the virtualization manager 206 allows the operating system 204b to write data to the disk drive. In one embodiment, the virtualization manager 206 can use any suitable resource allocation method, such as first-come first-served allocation, priority allocation, priority allocation with preemption, etc. From block 312, the flow ends.

While FIG. 3 describes resource sharing, FIG. 4 describes communicating data between operating systems. The discussion continues with FIG. 4.

FIG. 4 is a flow diagram illustrating operations for communicating data between operating systems of a gaming device, according to example embodiments of the invention. The flow diagram 400 commences at block 402.

At block 402, a communication channel is established with an operating system of the gaming device. For example, the operating system 204b establishes a communication channel 216 with the operating system 204c. In one embodiment, the operating systems 204a-c can use any suitable method for establishing a communications channel. For example, they can use shared memory, direct memory access, and/or serial port connections.

In one embodiment, the virtualization manager 206 assigns different addresses to each operating system (e.g., an Internet Protocol address), so each operating system can transmit and receive data to the other operating systems over a virtual communication network. As a result, the operating systems 204a-c can use standard networking communication protocols for exchanging data. For example, the operating system 204b can establish a socket with operating system 204c and then transmit data to operating system 204c using TCP/IP protocols. In this embodiment, data transmissions between the operating systems 204a-c are relatively fast and reliable because the data never leaves the gaming device 210. The flow continues at block 404.

At block 404, gaming information is received from the other operating system. For example, the operating system 204b receives gaming information from the operating system 204c through a socket or shared memory. The flow continues at block 406.

At block 406, using the gaming information, gaming operations are performed. For example, the gaming device software unit 202b, which is running on the operating system 204b, performs gaming operations based on the gaming information. In one embodiment, the gaming operations can include determining an outcome of the wagering game, performing wagering game I/O, performing wagering game accounting, forming wagering game security, etc. The flow continues at block 408.

At block 408, information associated with the gaming operations is communicated to the other operating system. For example, the operating system 204b communicates information associated with the gaming operations to the operating system 204c. In one embodiment, the information can include gaming outcome information, security information, accounting information, etc. From block 408, the flow ends.

While this section described operations performed by embodiments of the invention, the next section describes additional embodiments of the invention.

Example Implementation

Figure 7:
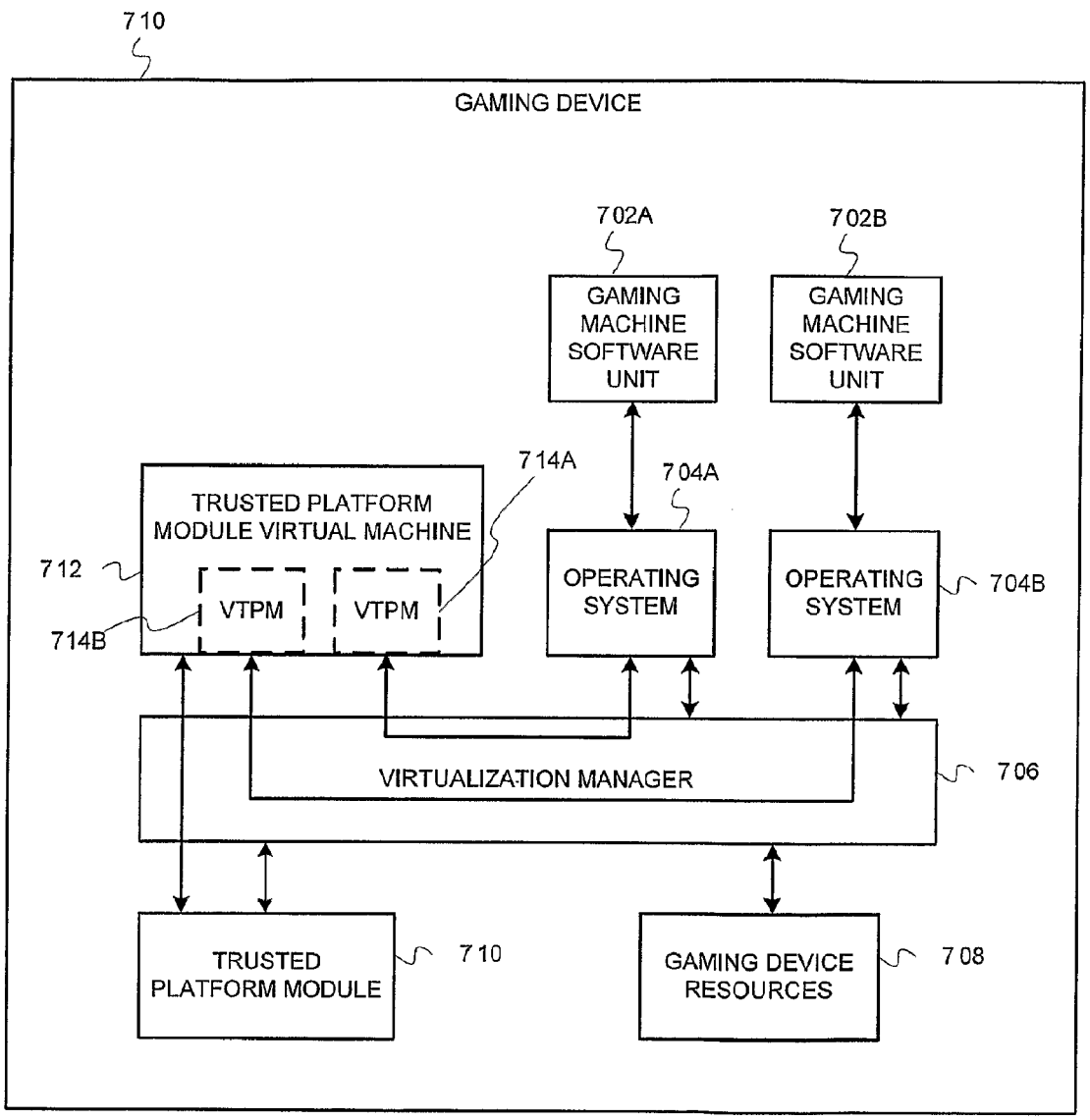
FIG. 7 is a block diagram illustrating a gaming device including a virtualization manager and components for enhancing trust in the gaming device, according to example embodiments of the invention.
Figure 8:
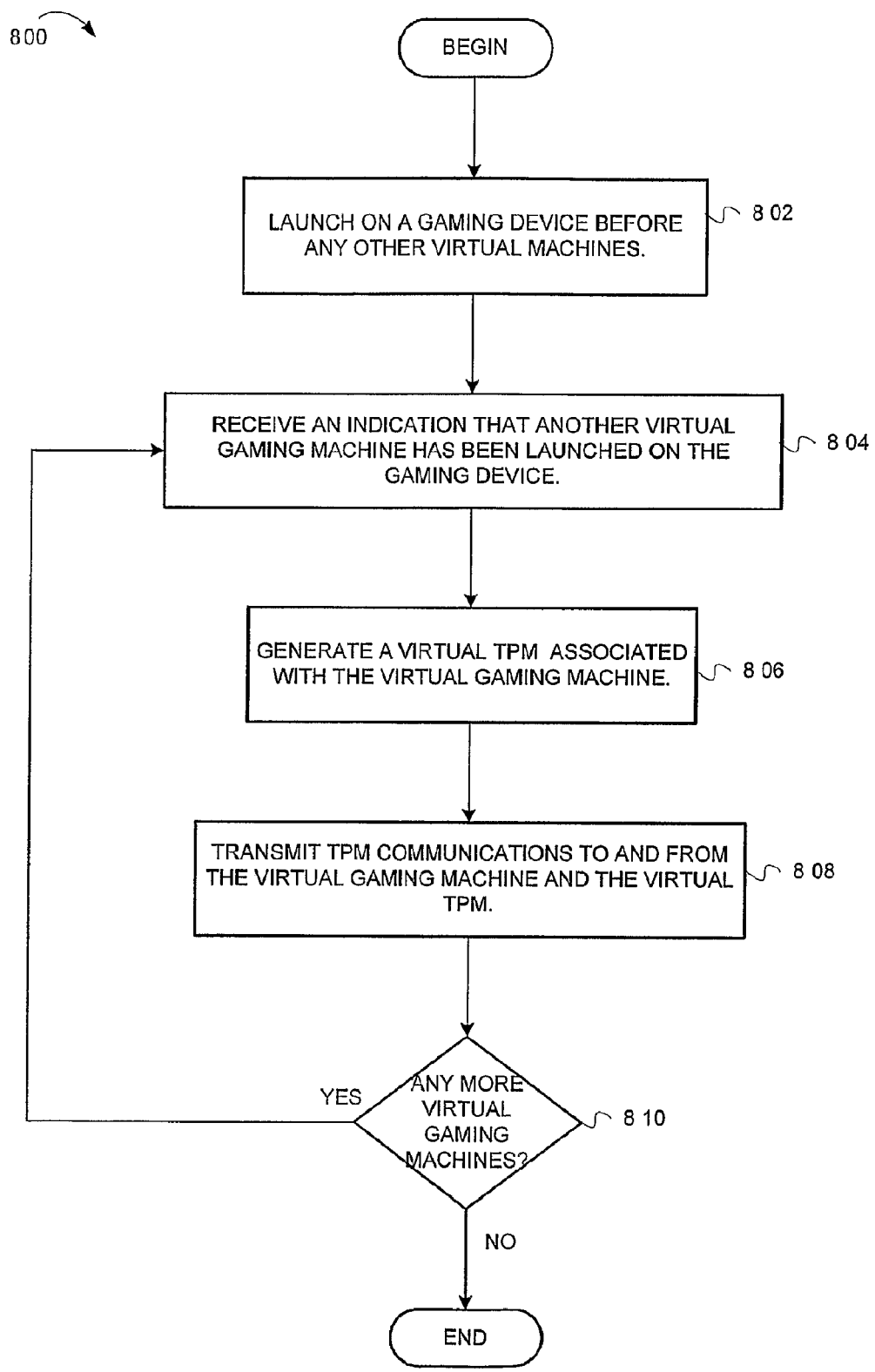
FIG. 8 is a flow diagram illustrating operations for launching and running a plurality of trusted virtual machines in a gaming device, according to example embodiments of the invention.

This section describes additional implementation details, according to example embodiments of the invention. In this section, the discussion of FIG. 5 describes a gaming device capable of conducting multiple wagering games, whereas the discussion of FIG. 6 describes multiple wagering game servers running on a single device. FIGS. 7 and 8 describe additional security features for embodiments of the virtualization manager.

Multiple Wagering Gaines

Figure 5:
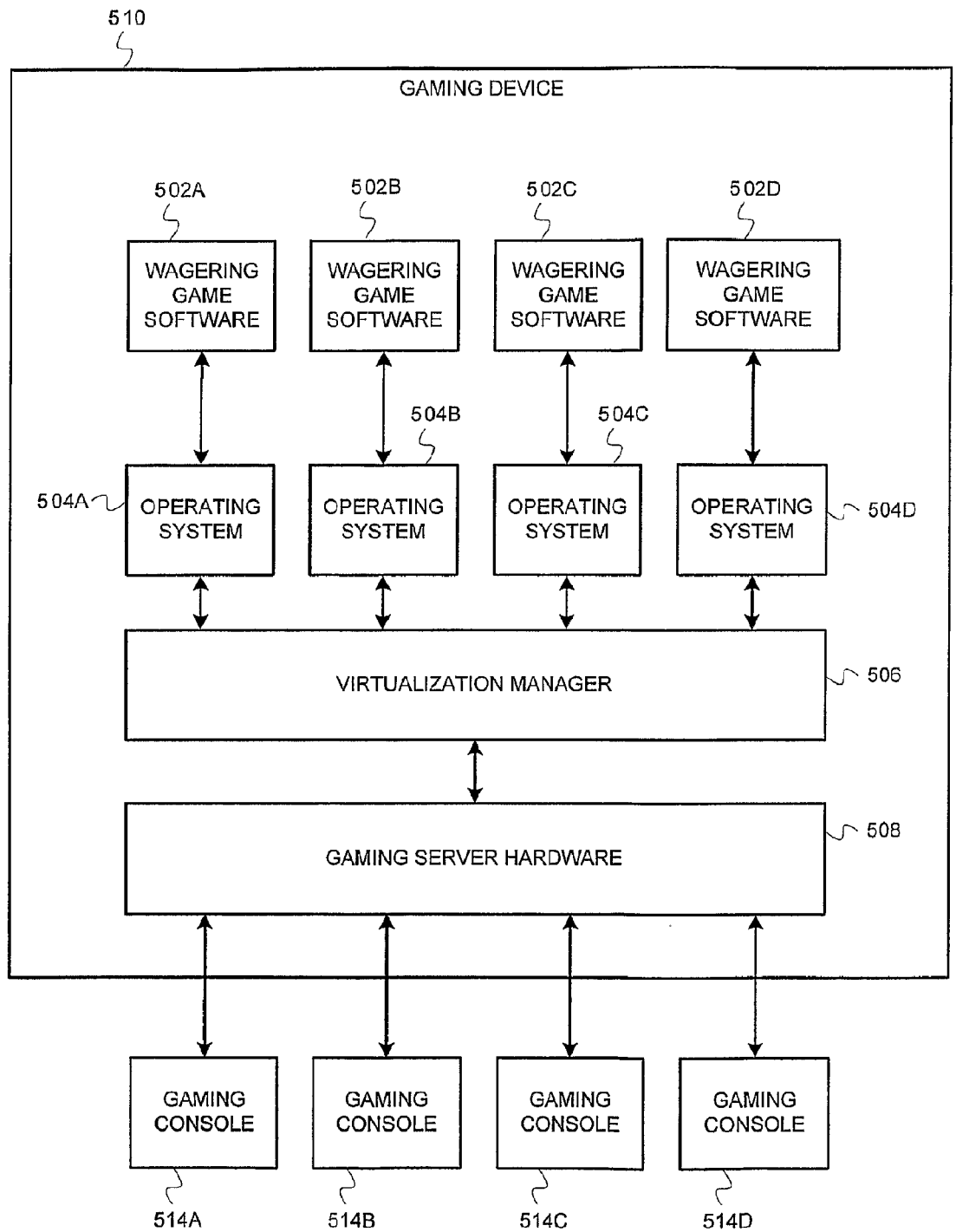
FIG. 5 is a block diagram illustrating a gaming server, according to example embodiments of the invention.

FIG. 5 is a block diagram illustrating a gaming server, according to example embodiments of the invention. As shown in FIG. 5, the gaming server 510 includes wagering game software 502a-d, operating systems 504a-d, virtualization manager 506, gaming server hardware 508, and gaming consoles 514a-d.

In one embodiment, each gaming console works together with an operating system and wagering game software to conduct a wagering game. For example, gaming console 514a, operating system 504a, and wagering game software 502a work together to conduct one wagering game. In the embodiment shown in FIG. 5, virtualization manager 506 enables the gaming server 510 to virtually simultaneously conduct four different wagering games. According to embodiments, the gaming server 510 can increase or decrease its ability to conduct wagering games by adding or removing gaming consoles, operating systems, and wagering game software.

In one embodiment, the gaming consoles 314a-d can be placed on a casino floor, while the gaming server 510 can be stored in a secure backroom. In one embodiment, the gaming consoles 314a-d are capable of processing wagering game I/O.

In one embodiment, the gaming server 510 can include additional wagering game software (not shown) running on one of the operating systems 504a-d. The additional wagering game software can determine outcomes of all the wagering games, while the wagering game software 502a-d can process wagering game I/O and present the wagering game results on the gaming consoles 314a-d. The additional wagering game software can communicate to the wagering game software 502a-d using the communication techniques described above (see FIG. 3).

Multiple Gaming Servers

Figure 6:
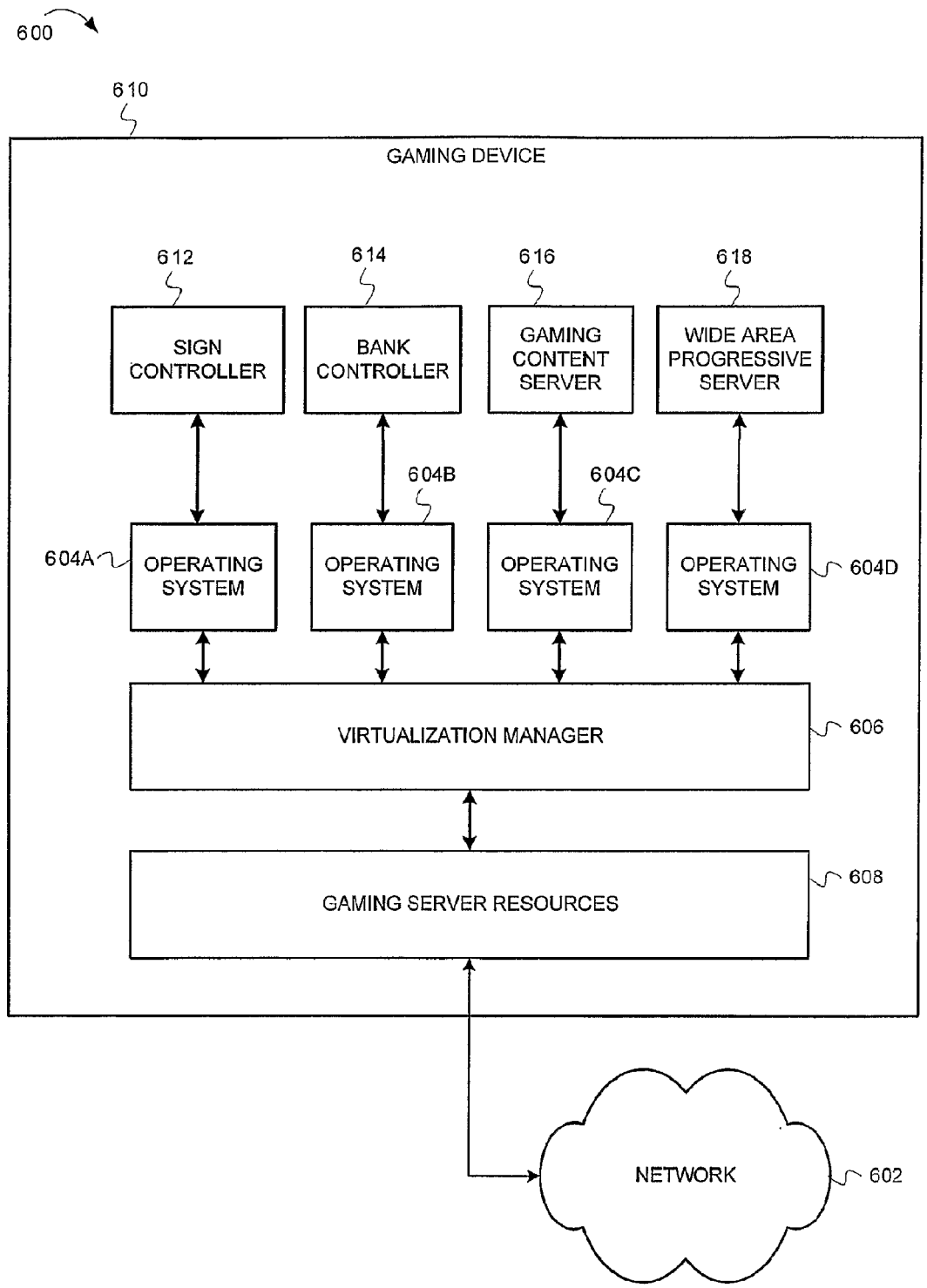
FIG. 6 is a block diagram illustrating a plurality of gaming servers operating on a single gaming device, according to example embodiments of the invention.

FIG. 6 is a block diagram illustrating a gaming device running plurality of gaming servers, according to example embodiments of the invention. As shown in FIG. 6, the gaming device 610 can include gaming server resources 608, a virtualization manager 606, and operating systems 604a-d. The gaming device 600 also includes a sign controller 612, bank controller 614, gaming content server 616, and wide area progressive server 618, each of which executes using one of the operating systems 604a-d.

According to embodiments, the sign controller 612 controls a sign associated with one or more gaming machines/consoles on the network 602, whereas the bank controller 614 performs control operations for a bank (i.e., a group) of gaming machines on the network 602. The gaming content server 616 delivers updated gaming content (e.g., audio content, video content, pay tables, etc.) to gaming machines connected to the network 602, while the wide area progressive server determines progressive jackpots for gaming machines on the network 602. In one embodiment, the virtualization manager 606 enables all of the servers to operate virtually simultaneously within a single gaming device.

Enhancing Trust

FIG. 7 is a block diagram illustrating a gaming device including a virtualization manager and components for enhancing trust in the gaming device, according to example embodiments of the invention. In FIG. 7, the gaming device 700 includes a virtualization manager 706, which is connected to a trusted platform module 710 and a trusted platform module virtual machine 712. The virtualization manager 706 is also connected to gaming device resources 708, operating system 704A, and operating system 704B. The operating systems 704A and 704B are connected to gaming machine software units 702A and 702B, respectively.

As shown in FIG. 7, in one embodiment, communications between the operating systems 704A and 704B and the trusted platform module virtual machine 712 pass through the virtualization manager 706.

The trusted platform module 710 can be an application specific integrated circuit disposed on a circuit board along with the gaming device's central processing unit. Alternatively, the trusted platform module 710 can be disposed inside the gaming device's central processing unit (see FIG. 9) or it can be an add-in card. In one embodiment, the trusted platform module 710 includes hardware that is secure from external software attacks and physical theft.

In one embodiment, the trusted platform module 710 includes hardware for generating and storing trusted information, such as keys and digital signatures, which can be used by the operating systems 704A & 704B and gaming machine software units 702A & 702B. For example, the gaming machine software unit 702A can use the trusted platform module's keys (or a derivation of its keys) for authenticating data exchanged over a network. In one embodiment, the trusted platform module's trusted information is securely held and only accessible through the trusted platform module virtual machine 712. Thus, the trusted platform virtual machine 712 limits access to the trusted platform module 710 so that multiple operating systems cannot simultaneously access the trusted platform module's secure information.

According to embodiments, the trusted platform module 710 enables the gaming device 700 to establish a chain of trust for all the gaming device components. For example, the trusted platform module 710 can authenticate and digitally sign the virtualization manager 706 using secure keys. The virtualization manager 706 can, in turn, authenticate and digitally sign the operating systems 704A & 704B using the trusted platform module's secure keys (or derivations of the trusted platform module's secure keys). This can continue until all components have been authenticated and digitally signed. Later, the gaming device can verify the digital signatures in an effort to ensure that none of the components have been modified. Operations of embodiments of the gaming device 700 are described below, in the discussion of FIG. 8.

FIG. 8 is a flow diagram illustrating operations for launching and running a plurality of trusted virtual machines in a gaming device, according to example embodiments of the invention. The operations of the flow 800 will be described with reference to the embodiments shown in FIG. 7. The flow 800 begins at block 802.

At block 802, a trusted platform module virtual machine 712 launches on a gaming device. In one embodiment, the trusted platform module virtual machine 712 launches before any other virtual machines launch. The flow continues at block 804.

At block 804, the trusted platform module virtual machine 712 receives an indication that a virtual gaming machine has been launched on the gaming device 700. In one embodiment, the virtual machine includes the operating system 704A and the gaming machine software unit 702A. The flow continues at block 806.

At block 806, the trusted platform module virtual machine 712 generates and stores a virtual trusted platform module 714B, which is associated with the virtual gaming machine. The flow continues at block 808.

At block 808, the virtual trusted platform module 714B provides the operating system 704B with trusted information, such as trusted keys, passwords, digital certificates, etc. In one embodiment, the virtual trusted platform module 714B creates the trusted information using secure information stored in the trusted platform module 710. In another embodiment, the virtual trusted platform module 714B retrieves and passes-on keys, passwords, and/or digital certificates stored in the trusted platform module 710. The operating system 704A can use the trusted information in any suitable matter, including digitally signing data, exchanging keys, verifying digital signatures, etc. The flow continues at block 810.

At block 810, the trusted platform module virtual machine 712 determines whether any additional virtual machines will launch. If no additional machines will launch, the flow ends. Otherwise, the flow continues at block 804.

Example Gaming Devices and Gaming Networks

This section describes example gaming devices and gaming networks with which embodiments of the invention can be practiced. This section also describes example gaming machines.

Example Gaming Device Architecture

Figure 9:
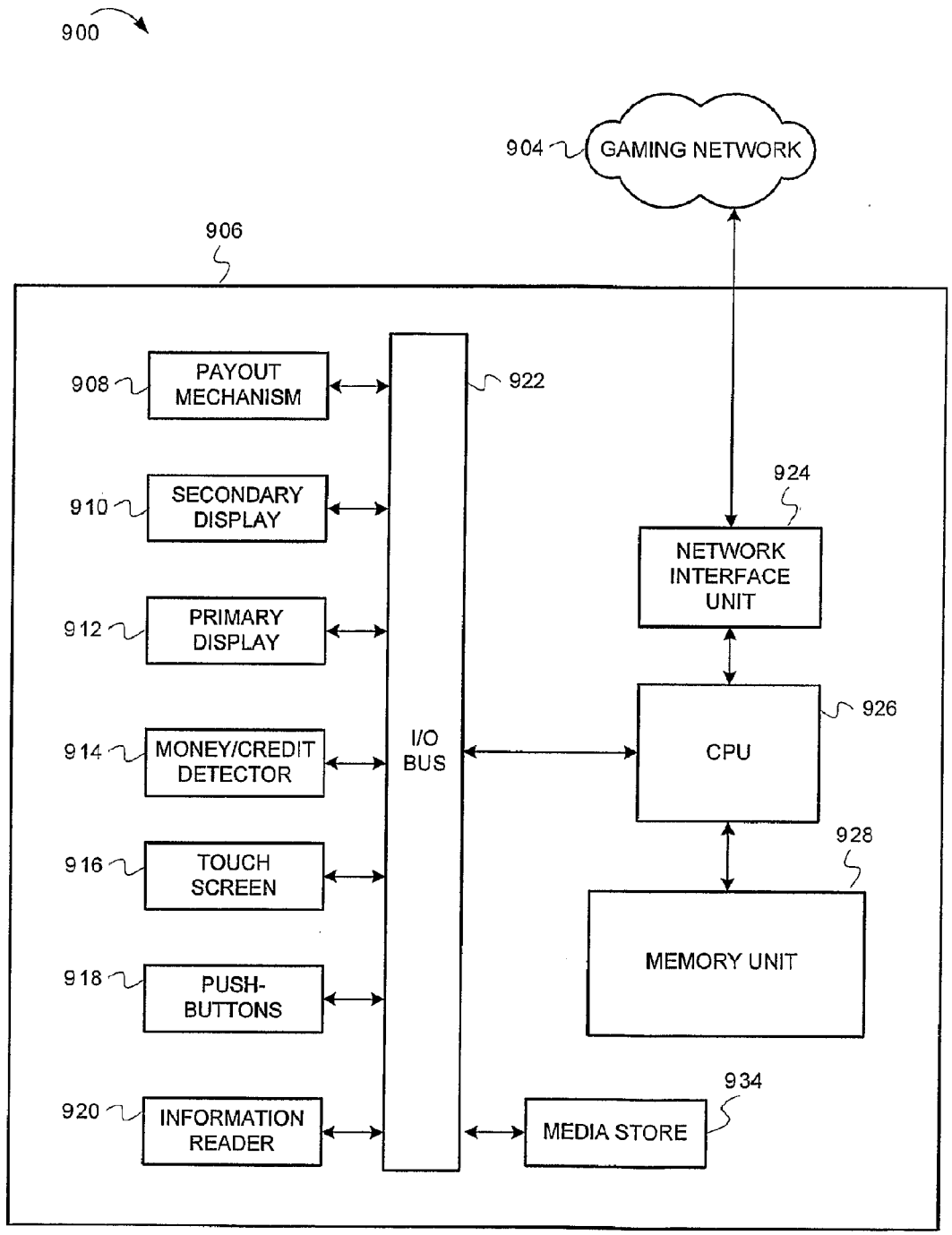
FIG. 9 is a block diagram illustrating components of a gaming device, used in conjunction with example embodiments of the invention.

FIG. 9 is a block diagram illustrating components of a gaming device, used in conjunction with example embodiments of the invention. As shown in FIG. 9, the gaming device 906 includes a central processing unit (CPU) 926 connected to a memory unit 928. According to embodiments, the memory unit 928 can include tangible machine-readable media including instructions for conducting any suitable casino-style wagering game (including bonus events), such as video poker, video black jack, video slots, etc.

The CPU 926 is connected to a network interface unit 924, which is connected to a gaming network 904. The CPU 926 is also connected to an input/output (I/O) bus 922. The I/O bus 922 is connected to a media store 934, which can be any suitable persistent storage device capable of storing audio and video segments. The media store 934 can be a DVD drive, CD-ROM drive, hard disk drive, semiconductor memory device, or other device suitable for storing media for using in wagering games.

The I/O bus 922 is also connected to payout mechanism 908, secondary display 910, primary display 912, money/credit detector 914, touchscreen 916, post-buttons 718, and information reader 720. The I/O bus 722 facilitates communication between the system components and the CPU 726.

According to some embodiments, the gaming device 906 can include additional peripheral devices and/or more than one of each component shown in FIG. 9. For example, in one embodiment, the gaming device 906 can include multiple network interface units 924 and multiple CPUs 926. Additionally, the components of the gaming device 906 can be interconnected according to any suitable interconnection architecture (e.g., directly connected, hypercube, etc.).

In one embodiment, the gaming device 906 can be connected with a plurality gaming consoles for conducting a plurality of wagering games. In another embodiment, the gaming device 906 can run a plurality of gaming servers and controllers. In yet another embodiment, the gaming device can be employed as a gaming machine for conducting wagering games. Gaming machines are described in more detail below, in the discussion of FIG. 8.

Example Gaming Machine

Figure 10:
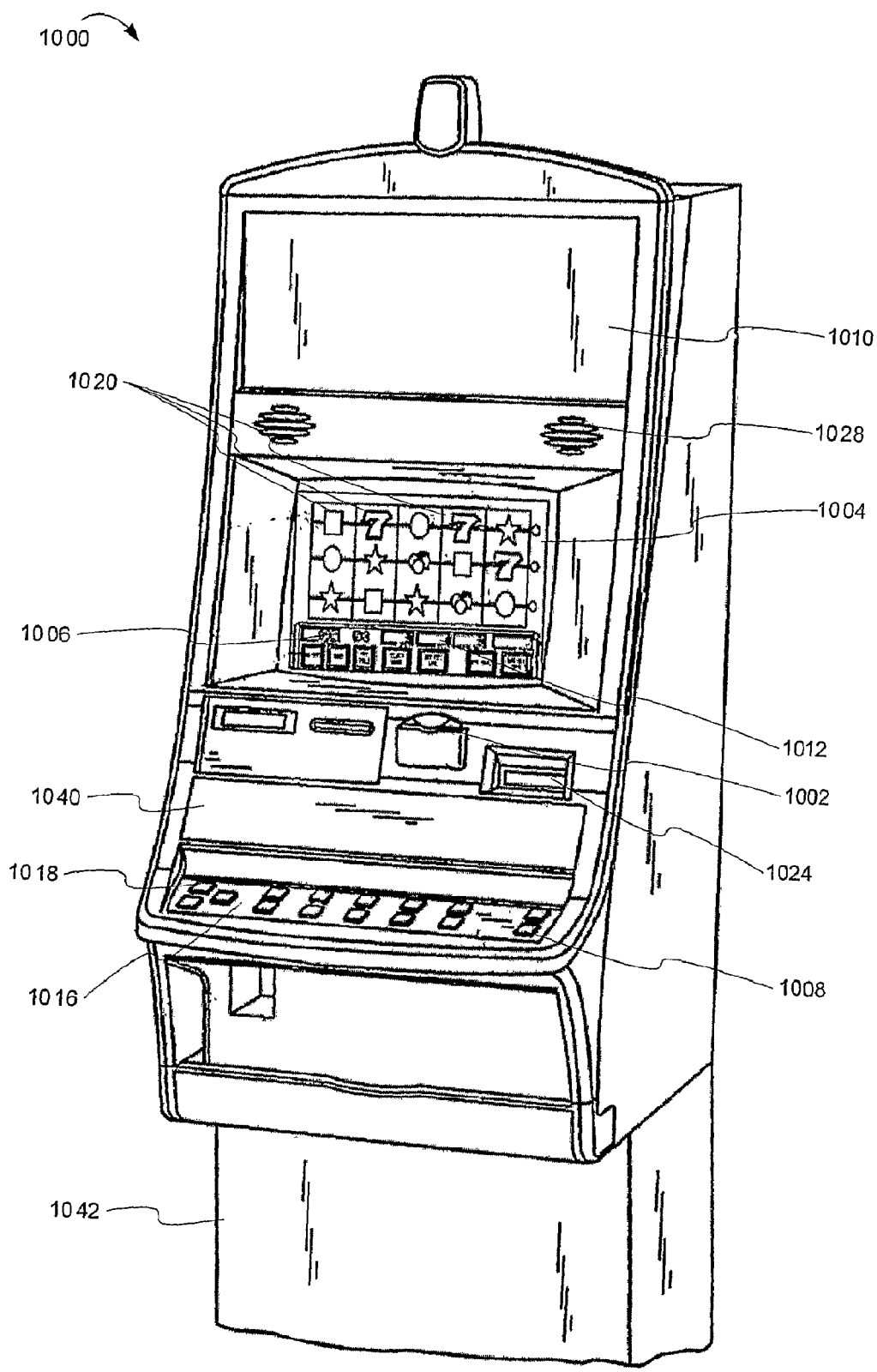
FIG. 10 is a perspective view of a gaming machine, according to example embodiments of the invention.

FIG. 10 is a perspective view of a gaming machine, according to example embodiments of the invention. As shown in FIG. 10, the gaming machine 1000 can be a computerized slot machine having the controls, displays, and features of a conventional slot machine.

The gaming machine 1000 can be mounted on a stand 1042 or it can be constructed as a pub-style tabletop game (not shown). As a result, the gaming machine 1000 can be operated while players are standing or seated. Furthermore, the gaming machine 1000 can be constructed with varying cabinet and display designs. The gaming machine 1000 can incorporate any primary game such as slots, poker, or keno, and additional bonus round games. The symbols and indicia used on and in the gaming machine 1000 can take mechanical, electrical, or video form.

As illustrated in FIG. 10, the gaming machine 1000 includes a coin slot 1002 and bill acceptor 1024. Players can place coins in the coin slot 1002 and paper money or ticket vouchers in the bill acceptor 1024. Other devices can be used for accepting payment. For example, credit/debit card readers/validators can be used for accepting payment. Additionally, the gaming machine 1000 can perform electronic funds transfers and financial transfers to procure monies from financial accounts. When a player inserts money in the gaming machine 1000, a number of credits corresponding to the amount deposited are shown in a credit display 1006. After depositing the appropriate amount of money, a player can begin playing the game by pushing play button 1008. The play button 1008 can be any play activator used for starting a wagering game or sequence of events in the gaming machine 1000.

As shown in FIG. 10, the gaming machine 1000 also includes a bet display 1012 and one or more "bet" buttons on the panel 1016. The player can place a bet by pushing one or more of the bet buttons on the panel 1016. The player can increase the bet by one or more credits each time the player pushes a bet button. When the player pushes a "bet one" button 1016, the number of credits shown in the credit display 1006 decreases by one credit, while the number of credits shown in the bet display 1012 increases by one credit.

A player may end the gaming session or "cash-out" by pressing a cash-out button 1018. When a player cashes-out, the gaming machine 1000 dispenses a voucher or currency corresponding to the number of remaining credits. The gaming machine 1000 may employ other payout mechanisms such as credit slips (which are redeemable by a cashier) or electronically recordable cards (which track player credits), or electronic funds transfer.

The gaming machine also includes a primary display unit 1004 and a secondary display unit 1010 (also known as a "top box"). The gaming machine may also include an auxiliary video display 1040. In one embodiment, the primary display unit 1004 displays a plurality of video reels 1020. According to embodiments of the invention, the display units 1004 and 1010 can include any visual representation or exhibition, including moving physical objects (e.g., mechanical reels and wheels), dynamic lighting, and video images. In one embodiment, each reel 1020 includes a plurality of symbols such as bells, hearts, fruits, numbers, letters, bars or other images, which correspond to a theme associated with the gaming machine 1000. Additionally, the gaming machine 1000 also includes an audio presentation unit 1028. The audio presentation unit 1028 can include audio speakers or other suitable sound projection devices.

In one embodiment, the gaming machine 1000 can include a virtualization manager for sharing resources between a plurality of operating systems, as further described herein.

Example Gaining Network

Figure 11:
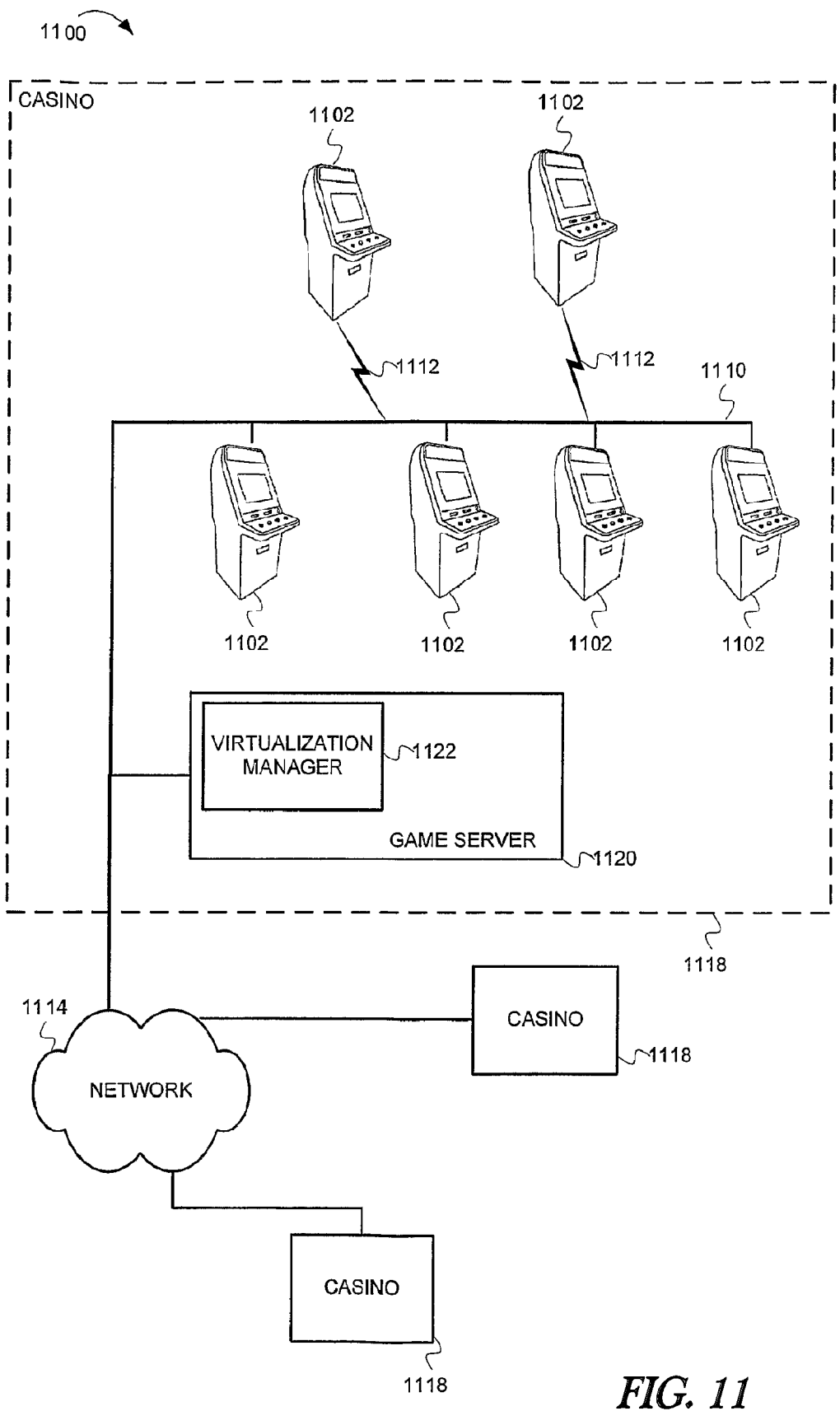
FIG. 11 is a block diagram illustrating a wagering game network, according to example embodiments of the invention.

FIG. 11 is a block diagram illustrating a wagering game network, according to example embodiments of the invention. In some embodiments, the gaming devices described above can be part of a wagering game network.

As shown in FIG. 11, the wagering game network 1100 includes a plurality of casinos 1118 connected to a communications network 1114. Each of the plurality of casinos 1118 can include local area networks, which include a plurality of gaming machines 1102 connected to a game server 1120. The game server 1120 includes a virtualization manager 1122. In one embodiment, the gaming server 1120 and gaming machines 1102 include tangible machine-readable media including instructions for performing operations for sharing resources between a plurality of operating systems, as described herein.

The components of each casino 1118 can communicate over wired 1110 and/or wireless connections 1112. Furthermore, they can employ any suitable connection technology, such as Bluetooth, 802.11, Wireless Application Protocol (WAP), Ethernet, public switched telephone networks, etc.

General

In this description, numerous specific details are set forth. However, it is understood that embodiments of the invention may be practiced without these specific details. In other instances, well-known circuits, structures and techniques have not been shown in detail in order not to obscure the understanding of this description. Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein. Each claim, as may be amended, constitutes an embodiment of the invention, incorporated by reference into the detailed description.

Herein, block diagrams illustrate example embodiments of the invention. Also herein, flow diagrams illustrate operations of the example embodiments of the invention. The operations of the flow diagrams are described with reference to the example embodiments shown in the block diagrams. However, it should be understood that the operations of the flow diagrams could be performed by embodiments of the invention other than those discussed with reference to the block diagrams, and embodiments discussed with references to the block diagrams could perform operations different than those discussed with reference to the flow diagrams. Additionally, some embodiments may not perform all the operations shown in a flow diagram. Moreover, although the flow diagrams depict serial operations, certain embodiments could perform certain of those operations in parallel.

The invention claimed is:

1. A computer-implemented method of conducting a wagering game on a gaining system, operations of the wagering game being split between a first gaming application executing on a first operating system (first O/S) and a second gaming application executing on a second operating system (second O/S), the gaming system including a virtualization manager enabling communication between and sharing gaming device resources between the first O/S and the second O/S, the method comprising:
   receiving, via at least one input device, a wager from a player initiating the wagering game;
   determining, via one or more processors executing the first application, an outcome of the wagering game;
   communicating, via the virtualization manager, the outcome determined by the first application to the second application;
   generating, via the second application, one or more game images representing the outcome; and
   displaying, via one or more display device resources, the one of more game images to the player.

2. The method of claim 1, wherein the one or more processors includes at least a first processor running the first O/S and a second processor running the second O/S.

3. The method of claim 1, wherein input device resources, including the at least one input device, and output device resources including the one or more display devices, utilized by the wagering game are controlled by one or more gaming device applications running on the second O/S.

4. The method of claim 1, wherein the virtualization manager comprises a module executed by the one or more processors.

5. The method of claim 1, further comprising:
   receiving a second wager from a second player to initiate another wagering game, the another wagering game being initiated during play of the at least one wagering game, operations of the another wagering game being split between the first application on the first O/S and a third application on a third O/S;
   determining , via the first application, another outcome of the another wagering game;
   communicating the another outcome from the first application to the third application;
   generating, via the third application, one or more additional game images representing the another outcome; and
   displaying the one or more additional game images to a player on he one or more display devices.

6. The method of claim 1, wherein the virtualization manager further receives requests for gaming device resources from the first O/S and the second O/S, and allocates the gaming device resources to the first O/S and second O/S.

7. A gaming system configured to conduct at least one wagering game, operations of the at least one wagering game being split between a first application executing on a first operating system (first O/S) and a second application executing on a second operating system (second O/S), the gaming system comprising:
   at least one input device for receiving a wager from a player to initiate the at least one wagering game;
   one or more display devices;
   a virtualization manager enabling communication and sharing gaming device resources between the first O/S and the second O/S;
   one or more processors executing the first application on the first O/S and the second application on the second O/S; and
   at least one memory device storing instructions that, when executed by the one or more processors, cause the gaming system to:
      receive the wager to initiate the at least one wagering game;
      determining, via the first application on the first O/S, an outcome of the at least one wagering game;
      communicate, via the virtualization manager, the outcome determined by the first application to the second application;
      generate, via the second application on the second O/S, one or more game images representing the outcome; and
      display the one or more game images to the player on the one or more display devices.

8. The gaming system of claim 7, wherein input device resources, including the at least one input device, and output device resources, including the one or more display devices, utilized by the at least one wagering game are controlled by one or more gaming device applications running on the second O/S.

9. The gaming system of claim 7, further comprising:
   receiving a second wager from a second player to initiate another wagering game, the another wagering game being initiated during play of the at least one wagering game, operations of the another wagering game being split between the first application on the first O/S and a third application on a third O/S;
   determining, via the first application on the first O/S, another outcome of the another wagering game;
   communicating the another outcome from the first application to the third application;
   generating, via the third application on the third O/S, one or more additional game images representing the another outcome; and
   displaying the one or more additional game images to a player on the one or more display devices.

10. The gaming system of claim 7, further comprising a game server connected to a communications network, and wherein the at least one memory device resides on the game server.

11. The gaming system of claim 7, wherein the virtualization manager comprises a module stored on the at least one memory device and executed by at least one of the one or more processors.

12. The gaming system of claim 7, further comprising a trusted platform module, wherein the virtualization manager includes a trusted platform virtual machine (TPVM), the virtualization manager is authenticated using secure authentication data from the trusted platform module, and the TPVM authenticates the first O/S and the second O/S via the secure authentication data from the trusted platform module.

13. A machine-readable, non-transitory medium configured to conduct at least one wagering game on a gaming system, operations of the at least one wagering game being split between at least a first application executing on a first operating system (first O/S) and a second application executing on a second operating system (second O/S), the gaming system including a virtualization manager that enables communication between the first O/S and the second O/S, the medium including executable instructions that, when executed by one or more processors, cause the gaming system to perfbrm a method comprising:
   receiving, via at least one input device, a wager from a player initiating the at least one wagering game;

determining, via the one or more processors executing the first application on the first O/S, an outcome of the at least one wagering game;

communicating, via the virtualization manager, the outcome determined by the first application to the second application;

generating, via the one or more processors executing the second application on the second O/S, one or more game images representing the outcome; and displaying, via one or more display devices, the one or more game images to the player.

14. The medium of claim 13, wherein the one or more processors includes at least a first processor executing the first O/S and a second processor executing the second O/S.

15. The medium of claim 13 wherein the virtualization manager further receives requests for gaming device resources from the first O/S and the second O/S, and allocates the gaming device resources to the first O/S and second O/S.

16. The medium of claim 13, wherein input device resources, including the at least one input device, and output device resources including the one or more display devices, utilized by the wagering game are controlled by one or more gaming device applications running on the second O/S.

17. The medium of claim 13, wherein the gaming system further comprises a game server connected to a communications network, and wherein the medium resides on the game server.

18. The medium of claim 13, wherein the gaming system further comprises a plurality of gaming machines, each gaming machine comprising a corresponding input device and display device, wherein the at least one wagering game includes a separate wagering game initiated on each gaming machine of the plurality as well as a separate secondary O/S for each separate wagering game, and wherein a separate outcome for each separate wagering game is determined via the first application running on the first O/S, and game images representing each separate outcome are generated via various applications running on the secondary O/S's.

19. The medium of claim 13, wherein the virtualization manager comprises a module stored on the at least one memory device and executed by at least one of the one or more processors.

20. The medium of claim 13, the gaining system further comprising a trusted platform module, wherein the virtualization manager includes a trusted platform virtual machine (TPVM), the virtualization manager is authenticated using secure authentication data from the trusted platform module, and the TPVM authenticates the first O/S and the second O/S via the secure authentication data from the trusted platform module.

* * * * *